(12) United States Patent
Gossett

(10) Patent No.: US 7,918,252 B2
(45) Date of Patent: *Apr. 5, 2011

(54) TREE STUMP GRINDING TEETH

(76) Inventor: Johnny Gossett, Vermilion, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,441

(22) Filed: Apr. 9, 2010

(65) Prior Publication Data

US 2010/0193079 A1    Aug. 5, 2010

Related U.S. Application Data

(63) Continuation of application No. 11/676,880, filed on Feb. 20, 2007, now Pat. No. 7,694,704.

(51) Int. Cl.
*A01G 23/06*    (2006.01)

(52) U.S. Cl. ..................... 144/24.12; 144/218

(58) Field of Classification Search ............... 144/24.12, 144/162.1, 176, 218, 235, 241; 241/298; 407/30, 53, 113

See application file for complete search history.

(56) References Cited

U.S. PATENT DOCUMENTS

| | | | |
|---|---|---|---|
| 3,797,544 A | 3/1974 | Ver Ploeg | |
| 5,497,815 A | 3/1996 | Bowling | |
| 5,623,979 A | 4/1997 | Bowling | |
| 6,138,725 A | 10/2000 | Leonardi et al. | |
| 6,708,743 B2 | 3/2004 | Ziehm | |
| 7,104,294 B2 | 9/2006 | Kopocs et al. | |
| 7,694,704 B2 * | 4/2010 | Gossett | 144/24.12 |

* cited by examiner

*Primary Examiner* — Shelley Self
(74) *Attorney, Agent, or Firm* — Rankin, Hill & Clark LLP

(57) ABSTRACT

Tree stump grinding teeth for use in tree stump grinding wheel assemblies and tree stump grinding wheel assemblies that include one or more such grinding teeth. In the preferred embodiment of the invention, the grinding tooth includes a mounting base having a substantially flat surface from which a plurality of cleats project. The cleats are adapted to be received in corresponding bores formed in the wheel. A resilient impact pad is positioned between the mounting base of the grinding tooth and the wheel. The resilient impact pad protects the surface of the wheel from impact forces applied to the grinding tooth.

11 Claims, 6 Drawing Sheets

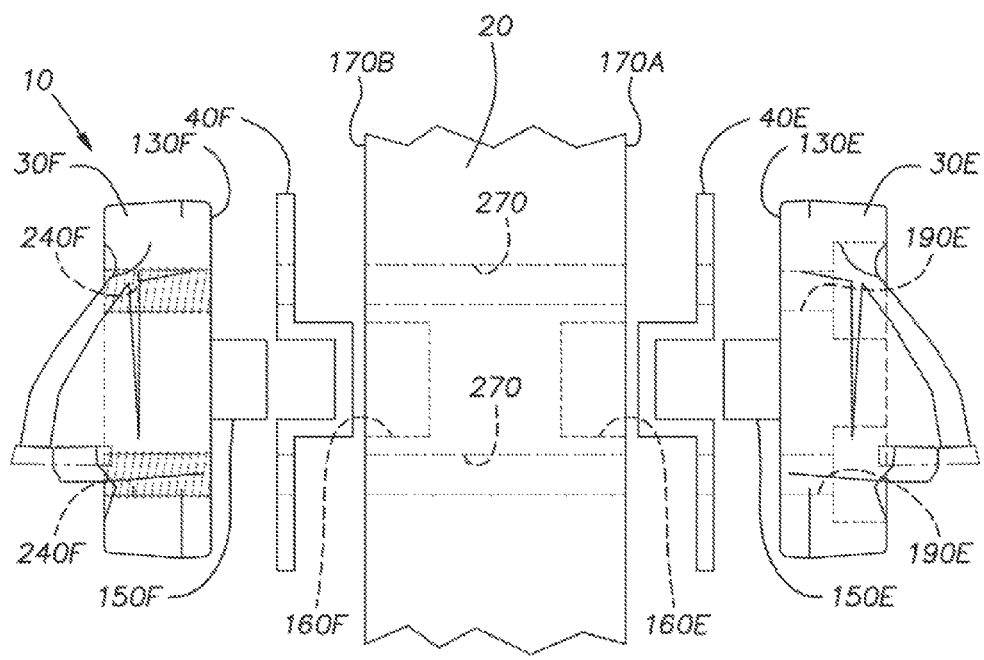
Fig. 12
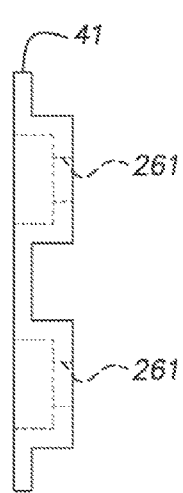 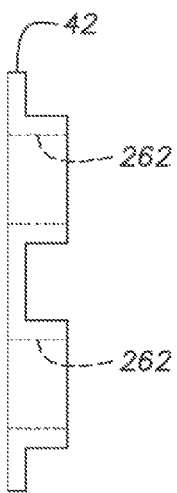 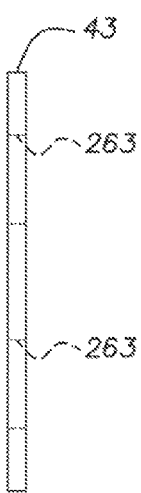 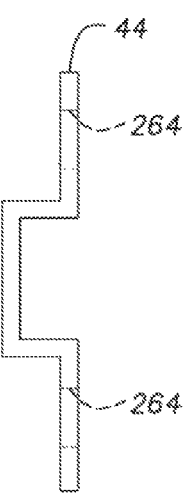
Fig. 13    Fig. 14    Fig. 15    Fig. 16

TREE STUMP GRINDING TEETH

CROSS-REFERENCE TO RELATED APPLICATIONS

This application is a continuation of application Ser. No. 11/676,880, filed Feb. 20, 2007, now U.S. Pat. No. 7,694,704.

BACKGROUND OF INVENTION

1. Field of Invention

The present invention relates to tree stump grinding teeth and to tree stump grinding wheel assemblies that include the same.

2. Description of Related Art

Conventional tree stump grinding machines include a tree stump grinding wheel assembly that comprises a vertically oriented wheel having a plurality of grinding teeth (which are sometimes also referred to in the art as "cutting teeth") mounted on both side surfaces thereof. The wheel is typically mounted on an extension arm or boom of a grinding machine, which rotates the wheel at relatively high speed in a forward direction relative to the grinding machine. An operator of the grinding machine moves the rotating wheel in plunging and sweeping motions relative to a tree stump to be removed, which causes the grinding teeth mounted thereon to make contact with the tree stump. The grinding teeth grind mounted to the rotating wheel impact against the tree stump and thereby cut or otherwise pummel the tree stump into chips, chunks or pieces until it is removed, typically below the grade of the surrounding soil.

During tree stump removal operations, the grinding teeth are subjected to very large impact and abrading forces. Over time, these forces can cause one or more of the grinding teeth to break off and/or to wear out. When this occurs, one or more of the grinding must be replaced. Replacement of grinding teeth is often a time consuming process because the radial projection of each grinding tooth must be positioned in a predetermined optimal orientation before it is fastened to the wheel.

In some prior art tree stump grinding wheel assemblies, the grinding teeth are positioned directly into contact with a side surface of the wheel and are fastened directly thereto using fasteners such as bolts. An example of such a prior art assembly is shown in Bowling, U.S. Pat. No. 5,497,815. This patent discloses a one-piece grinding tooth that includes a mounting base having at least one substantially flat surface that directly contacts the wheel. The grinding tooth is fastened to the wheel using at least one bolt, which passes through a bore in the mounting base. In the embodiments illustrated in the figures, two bolts are used to fasten each grinding tooth to the wheel. In this arrangement, the bolts are solely responsible for holding the grinding tooth to the wheel. Thus, if the impact force applied to the grinding tooth were greater than the shear strength of the bolts, the bolts would fail and the grinding tooth would shear away from the wheel. The loss of mass caused by the shearing away of one or more grinding teeth from the wheel could cause the wheel to become unbalanced, which could create potentially damaging vibration in the grinding machine.

Another drawback with the use of a grinding wheel assembly and grinding teeth such as disclosed in Bowling is that the holes bored in the wheel to receive the bolts are exposed to the risk of damage due to impact forces imparted to the teeth, which can be communicated through the bolts to the holes bored into the wheel. This can cause the holes bored into the wheel to become deformed and otherwise compromised. Consequently, the fit and/or orientation of replacement grinding teeth will not be optimal, and replacement grinding teeth may wear prematurely and/or become more readily dislodged from the wheel.

Yet another drawback with the use of the grinding wheel assembly and grinding teeth such as disclosed in Bowling is that the side surfaces of the wheel are exposed to the risk of damage due to impact forces translated through the grinding teeth. The impact force imparted to the tooth can cause the at least one substantially flat surface of the mounting base in direct contact with the wheel to dent, gouge or otherwise create surface imperfections in the wheel. Once the surface of the wheel has been damaged, it can be very difficult to properly mount replacement grinding teeth to the wheel. In addition, moisture can wick between grinding tooth and the wheel, which can promote rust and/or corrosion of the wheel, grinding teeth and/or bolts.

BRIEF SUMMARY OF THE INVENTION

The present invention is directed to tree stump grinding teeth for use in tree stump grinding wheel assemblies and to tree stump grinding wheel assemblies that comprise one or more of such grinding teeth. In a preferred embodiment of the invention, the tree stump grinding tooth comprises a mounting base having a substantially flat surface from which one or more cleats project. The cleats are adapted to be received in corresponding bores formed in the wheel. A resilient impact pad is positioned between the mounting base of the grinding tooth and the wheel. The resilient impact pad protects the surface of the wheel from impact forces applied to the grinding tooth.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 12 is an exploded front elevation view of an alternative embodiment of a tree stump grinding wheel assembly according to the invention showing several grinding teeth, impact pads, bolts and a portion of a wheel.

FIG. 13 is a front elevation view of one embodiment of an impact pad according to the invention.

FIG. 14 is a front elevation view of another alternative embodiment of an impact pad according to the invention.

FIG. 15 is a front elevation view of yet another alternative embodiment of an impact pad according to the invention.

FIG. 16 is a front elevation view of yet another alternative embodiment of an impact pad according to the invention.

DETAILED DESCRIPTION OF THE INVENTION

Figure 1:
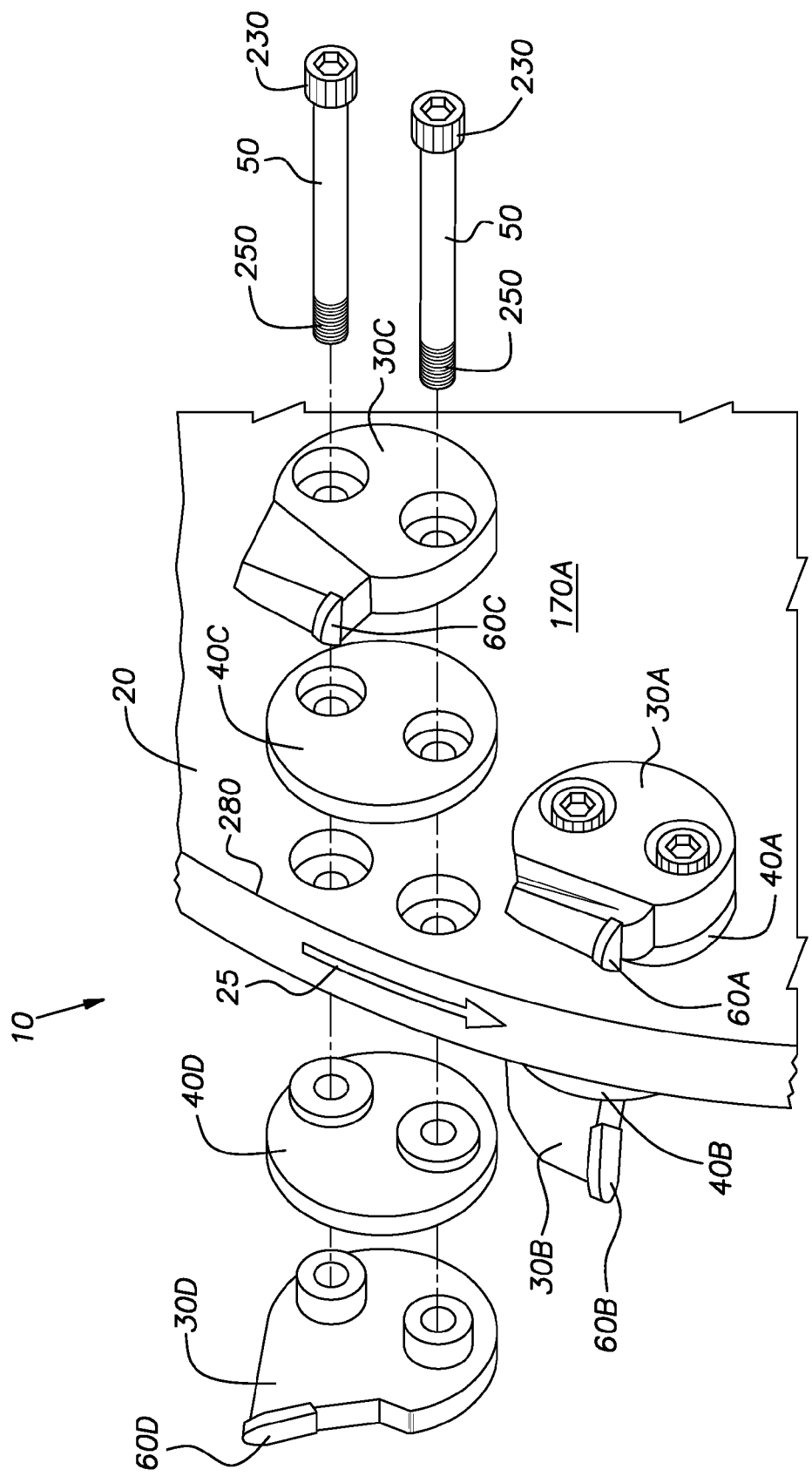
FIG. 1 is a partially exploded perspective view of one preferred embodiment of a tree stump grinding wheel assembly according to the invention showing several grinding teeth, impact pads, bolts and a portion of a wheel.

Referring now to the drawings, wherein like reference numerals have been used for similar elements throughout, FIG. 1 shows a partially exploded perspective view of one preferred embodiment of a tree stump grinding wheel assembly 10 according to the invention. This view shows a portion of a substantially vertical, rotatable wheel 20, a plurality of grinding teeth 30A, 30B, 30C, 30D, a plurality of impact pads 40A, 40B, 40C, 40D and a plurality of fasteners 50. The grinding teeth 30A, 30B, 30C, 30D are fastened in pairs to the wheel 20 using the fasteners 50, with the impact pads 40A, 40B, 40C, 40D positioned between the grinding teeth 30A, 30B, 30C, 30D and the wheel 20.

The tree stump grinding wheel assembly 10 according to the invention is adapted to be mounted to a stump grinding machine (not shown) that rotates the wheel assembly 10 at relatively high speed in a forward direction relative to the stump grinding machine (i.e., in the direction shown by arrow 25 on the peripheral edge of the wheel 20 in FIG. 1). An operator of the grinding machine moves the rotating wheel assembly 10 in plunging and sweeping motions relative to a tree stump to be removed, which causes cutting bits 60A, 60B, 60C, 60D mounted to the grinding teeth 30A, 30B, 30C, 30D (and other cutting bits not shown), to make contact with the tree stump. The cutting bits 60A, 60B, 60C, 60D cut or otherwise pummel the tree stump into small chips, chunks or pieces until the tree stump is removed (typically until the stump has been ground away below the grade of the surrounding soil).

Fasteners 50 are used to fasten the grinding teeth 30A, 30B, 30C, 30D to the wheel 20. In the preferred embodiment of the invention, the fasteners 50 are made of medium carbon alloy steel, and are in the form of socket head cap screw bolts. The bolts should be strong enough to securely fasten the grinding teeth to the wheel during stump grinding operations. Bolts having a diameter of from about 0.5" to about 1.25" and a Rockwell hardness of from about 33 to about 39 are typically sufficient. For smaller wheels (e.g., wheels having a diameter of 24" or less), a bolt diameter of about 0.625" is usually suitable. For larger wheels (e.g., wheels having a diameter of greater than 24"), a bolt diameter of about 0.875" is usually suitable. A variety of fasteners could be used within the scope of the invention, provided such fasteners exhibit sufficient strength to secure the grinding teeth to the wheel.

Figure 2:
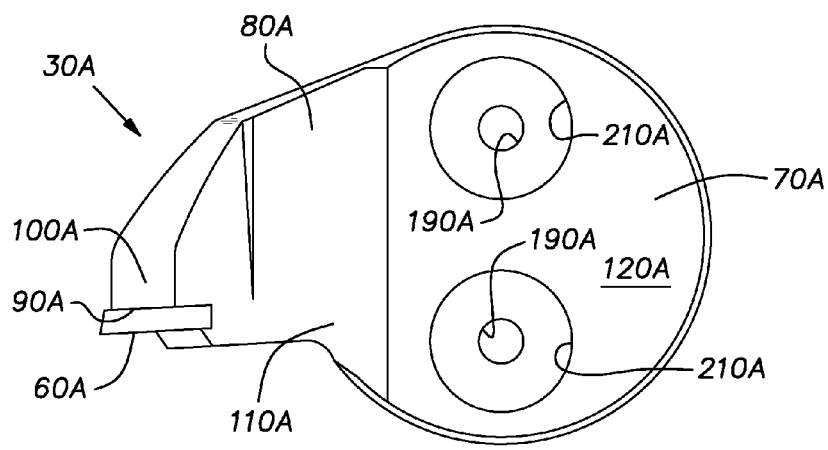
FIG. 2 is a side elevation view of one of the grinding teeth shown in FIG. 1.
Figure 3:
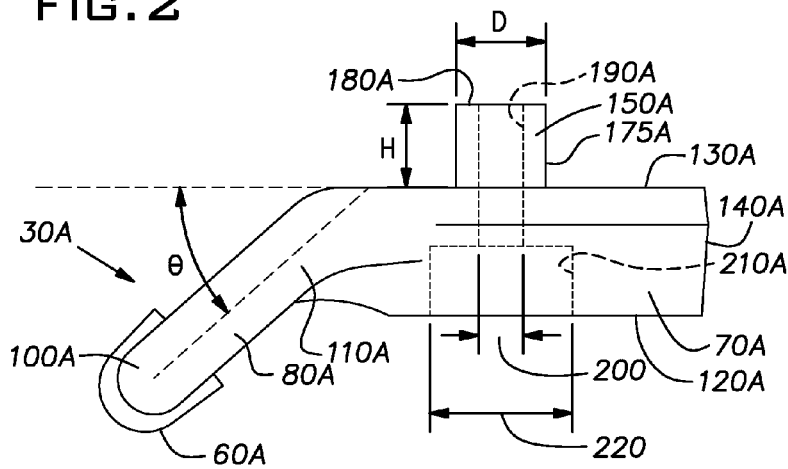
FIG. 3 is a top view further illustrating the grinding tooth shown in FIG. 2.

FIGS. 2 and 3 show a side elevation view and a top view, respectively, of grinding tooth 30A shown in FIG. 1. Grinding tooth 30A includes a mounting base portion 70A and a head portion 80A. Preferably, the mounting base portion 70A and the head portion 80A are integrally formed with one another and thus comprise a one-piece construction that is produced by metallic forging or casting. In a preferred embodiment, a metallic forging is made from AMS 4140 steel, but other metallic alloys having suitable mechanical properties are envisioned to be within the scope of the present invention. Forging is currently preferred over casting due to the ability to consistently produce grinding teeth of superior strength and durability.

As previously noted above, grinding tooth 30A further includes a cutting bit 60A, which is fixedly attached to the head portion 80A. The cutting bit 60A is preferably made of tungsten carbide, but alternatively may be made of other metallic alloys having comparable hardness and mechanical strength. The head portion 80A includes a seat 90A, which is milled in an inner surface of a distal end 100A of head portion 80A. The cutting bit 60A is preferably soldered to the seat 90A so that the distal end 100A supports the cutting bit 60A. Alternatively, the cutting bit 60A may be attached to the seat 90A with known industrial adhesives, or may be welded or brazed to the seat 90A. The transition between the mounting base portion 70A and the head portion 80A defines the proximal end 110A of the head portion 80A.

With particular reference to FIG. 3, the mounting base portion 70A of grinding tooth 30A includes an outer surface 120A and a substantially flat inner surface 130A. In the illustrated embodiment, the outer surface 120A and inner surface 130A are substantially parallel to one another. However, it will be appreciated that the outer surface 120A of the mounting base portion does not need to be planar, and does not need to be substantially parallel to the substantially flat inner surface 130A. For example, the outer surface 120A could be semi-hemispherical in shape, if desired.

The mounting base portion 70A of grinding tooth 30A further includes an edge portion 140A that extends between and interconnects the outer surface 120A and the inner surface 130A. The edge surface 140A generally defines a perimeter of mounting base portion 70A. In the illustrated embodiment, the perimeter of the mounting base portion 70A is generally circular in shape. However, it will be appreciated that the shape of the perimeter of the mounting base portion 70A is not critical, and that a shape other than generally circular (e.g., rectangular) could be used, if desired.

At least one and more preferably two or more cleats 150A project from the substantially flat inner surface 130A of the mounting base portion 70A of the grinding tooth 30A. The cleats 150A are preferably formed integrally with the mounting base portion 70A, but could be joined as separate components to the mounting base portion 70A, if desired. The cleats 150A are preferably cylindrical in shape, and are adapted to be received within corresponding cylindrical bores 160A (shown in FIG. 6) formed in the wheel 20.

The outer diameter "D" and the height "H" of the cleats 150A (as measured from the inner surface 130A) is not per se critical. An outer diameter "D" of about 0.5" to about 2.0", and more preferably about 0.75" to about 1.5", is typically sufficient. A height "H" of 0.25" to about 0.75", and more preferably about 0.5", is also typically sufficient. Spacing between cleats 150A is not critical. A spacing distance of 1.5" to about 2.5" as measured between the centers of adjacent cleats 150A is presently deemed to be sufficient.

As noted in greater detail below, in some embodiments of the invention, the fasteners are configured to pass through an opening formed through the center of the cleat (sometimes referred to herein as a "concentric" fastener arrangement). In other embodiments of the invention, the fasteners do not pass through the center of the cleats (sometimes referred to herein as an "eccentric" fastener arrangement). It will be appreciated that the outer diameter of cleats in concentric fastener arrangements will generally need to be larger than the outer diameter of cleats in eccentric fastener arrangements to accommodate the diameter of the fasteners.

An impact pad 40A is adapted to reside between the inner surface 130A of the grinding tooth 30A and a side surface 170A of the wheel 20. The primary function of the impact pad is to absorb and dissipate impact forces imparted to the grinding tooth 30A during stump grinding operations, so that such forces are not translated through the grinding tooth 30A directly to the side surface 170A of the wheel 20. The use of an impact pad 40A protects the side surface 170A of the wheel from damage, thereby extending the life of the wheel 20.

Preferably, the impact pad 40A is slightly compressible. Thus, as the fastener 50 is tightened to secure the grinding tooth 30A to the wheel 20, the impact pad 40A compresses and forms a seal between the inner surface 130A of the grinding tooth 30A and the side surface 170A of the wheel 20. This prevents moisture from wicking between the inner surface 130A of the grinding tooth 30A and the side surface 170A of the wheel 20, and thus prevents corrosion. The slight compressibility of the impact pad 40A also aids in the removal of the grinding teeth during servicing of the wheel assembly 10.

In the presently most preferred embodiment of the invention, the impact pad 40A is made of a polyurethane rubber having a Shore A hardness of from about 60 to about 100, and more preferably from about 70 to about 90. When this material is used, the thickness of the impact pad 40A is preferably from about 0.0625" to about 0.25", and most preferably about 0.125".

It will be appreciated that the impact pad 40A can be made of other materials that are "softer" than the steels used to manufacture the wheel 20 and grinding teeth 30A. For example, it may be possible to manufacture impact pads from light metals (e.g., aluminum or copper) or woven materials. However, in view of cost and performance, impact pads formed of synthetic polymers are preferred.

The impact pad 40A is preferably a separate and distinct component apart from the grinding tooth 30A. Thus, if the impact pad 40A should become damaged or should wear out, it can be replaced separate from the grinding tooth 30A (and vice versa). It will be appreciated, however, that one could apply a compressible coating to the inner surface 130A of the grinding tooth 30A and/or to the side surface 170A of the wheel (e.g., by dipping, brushing or spraying) to provide the same function of the impact pad 40A. This arrangement, while possible, is not preferred.

In the embodiment of the invention shown in FIGS. 1-6, the impact pad 40A is configured to cover the cylindrical side portion 175A of the cleats 150A and a portion of the bottom end 180A of the cleats 150A to prevent any portion of the cleats 150A from contacting the cylindrical bores 160A formed in the wheel 20. This arrangement protects the cylindrical bores 160A from becoming damaged due to impact forces imparted to the grinding tooth 30A during tree stump grinding operations. Forces translated through the grinding tooth 30A to the cleats 150A are absorbed and dissipated by the impact pad 40A.

As noted above, the grinding teeth 30A, 30B are preferably mounted to the wheel 20 as matched pairs. In the embodiment shown in FIG. 2, grinding tooth 30A is provided with two spaced apart clearance holes 190A, which are formed in the outer surface 120A and are substantially perpendicular to a plane defined by the substantially flat inner surface 130A. The clearance holes 190A extend through the entire thickness of the mounting base portion 70A and the height H of the cleats 150A. The clearance holes 190A are circular in shape, and have a diameter 200 which is sized so as to provide a small annular clearance around the shank portion of a fastener 50 passing through mounting base portion 70A. In this embodiment, the clearance holes 190A are concentric with the cleats 150A.

Mounting base portion 70A also includes a pair of counterbores 210A, which are formed in the outer surface 120A. The counterbores 210A are circular, have an inner diameter 220, and are substantially perpendicular to the plane defined by the inner surface 130A. Each counterbore 210A is concentric with a corresponding one of clearance holes 190A and extends only partially through the thickness of mounting base portion 70A. As shown in FIG. 3, the inner diameter 220 of counterbore 210A is larger than the diameter 200 of clearance holes 190A, thus making the counterbores 210A effective for engaging the head portion 230 of a fastener 50 (shown in FIG. 1) used to attach the grinding tooth 30A to the wheel 20.

Figure 4:
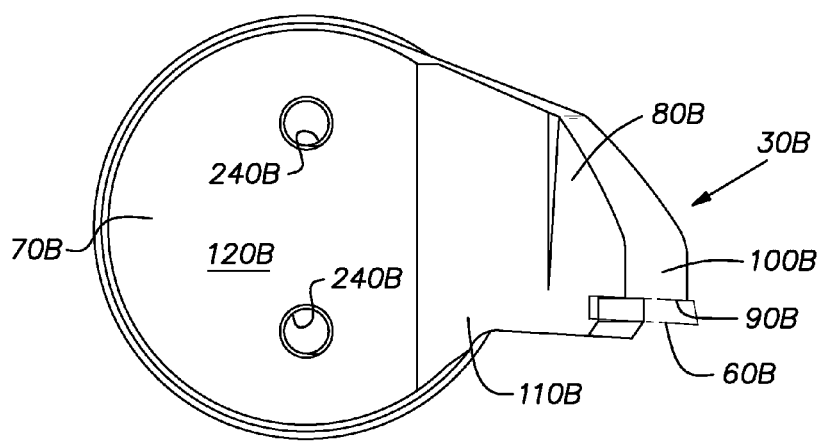
FIG. 4 is a side elevation view of another one of the grinding teeth shown in FIG. 1.
Figure 5:
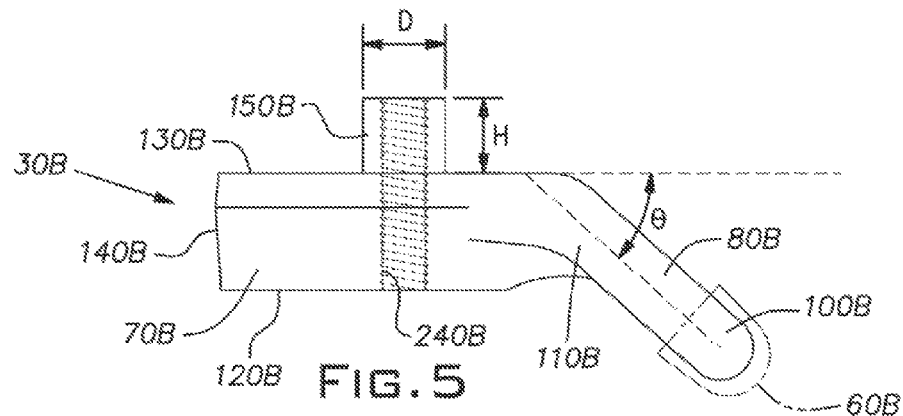
FIG. 5 is a top view further illustrating the grinding tooth shown in FIG. 4.

FIGS. 4 and 5 show grinding tooth 30B, which together with grinding tooth 30A, forms a mating pair of grinding teeth 30A, 30B for attachment to opposing side surfaces 170A, 170B of the wheel 20. Grinding tooth 30B is substantially a mirror image of grinding tooth 30A, except that grinding tooth 30B is not provided with clearance holes 190A and counterbores 210A. As with grinding tooth 30A, grinding tooth 30B includes a mounting base portion 70B and a head portion 80B, which are preferably integrally formed with one another and are made of a one-piece construction comprising a metallic forging which is preferably made from AMS 4140 steel. Other than being formed as a mirror image relative to grinding tooth 30A, the only other substantial structural difference between grinding tooth 30A and grinding tooth 30B is that grinding tooth 30B includes a pair of spaced apart tapped holes 240B instead of a pair of clearance holes 190A and counterbores 210A. Tapped holes 240B extend completely through the cleats 150B and the thickness of the mounting base portion 70B and therefore extend through the outer surface 120B and the inner surface 130B. Tapped holes 240B are substantially perpendicular to the plane defined by the inner surface 130B, and are concentric to the cleats 150B. The tapped holes 240B are preferably tapped with a thread for receiving the threads 250 on the ends of fastener 50. Thread size is not per se critical, but a thread size of 14 threads per inch class 2A is presently most preferred. It will be appreciated that other tapped-hole sizes and thread sizes may be used.

An impact pad 40B is adapted to reside between the inner surface 130B of grinding tooth 30B and the side surface 170B of the wheel 20. Preferably, the impact pad 40B positioned between the inner surface 130B of grinding tooth 30B and the side surface 170B of the wheel 20 is identical in all respects to the impact pad 40A that is positioned between the inner surface 130A of grinding tooth 30A and the side surface of the wheel 170A. It will be appreciated, however, that impact pad 40B could be different in configuration to impact pad 40A.

Figure 6:
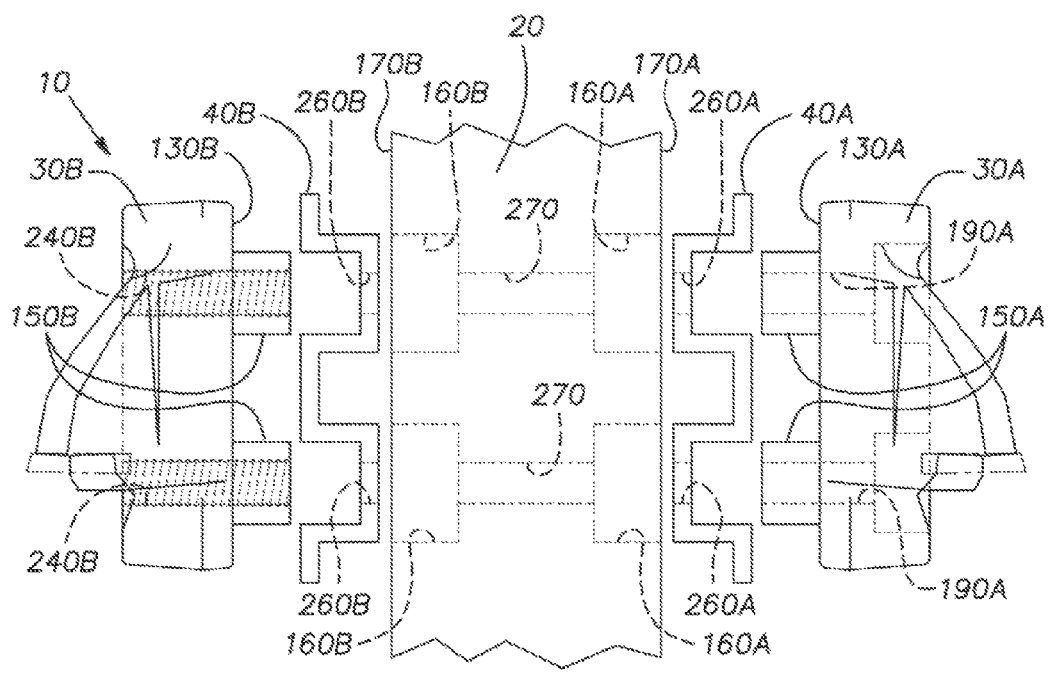
FIG. 6 is an exploded front elevation view of the grinding teeth, impact pads and a portion of the wheel shown in FIGS. 1-5.

With reference to FIG. 6, a stump grinding wheel assembly 10 according to the invention is assembled, in part, by positioning an impact pad 40A between grinding tooth 30A and the side surface 170A of the wheel 20. An impact pad 40B is also positioned between grinding tooth 30B and the opposite side surface 170B of the wheel. The cleats 150A, 150B of grinding teeth 30A, 30B are inserted into the appropriate cylindrical bores 160A, 160B formed in the wheel 20, which aligns the grinding teeth 30A, 30B in the optimal orientation. The threaded end 250 of a fastener 50 is inserted through one of the clearance holes 190A in grinding tooth 30A, such that it passes entirely through the thickness of the mounting base portion 70A, through a hole 260A in the impact pad 40A positioned between grinding tooth 30A and the wheel 20, through a hole 270 in the wheel 20, through a hole 260B in the impact pad 40B positioned between grinding tooth 30B and the wheel 20 and is threadingly received into one of the tapped holes 240B in grinding tooth 30B. A second fastener 50 is inserted through the other one of the clearance holes 190A in grinding tooth 30A in the same manner. The fasteners 50 are tightened to securely fasten grinding teeth 30A, 30B to the wheel 20.

It will be appreciated that the thickness of the mounting base portion 70A of grinding tooth 30A will be determined based upon considerations of the strength required to withstand repeated impact forces imparted on the cutting bits 60A contacting the tree stump, and to accommodate at least a portion of the head 230 of fastener 50, which is preferably completely recessed within counterbore 210A below the outer surface 120A of the mounting base portion 70A, as well as a portion of the shank of fastener 50, which extends through clearance hole 190A. The thickness of the mounting base portion 70B of grinding tooth 30B is preferably the same as the thickness of the mounting base portion 70A of grinding tooth 30A, but may be of any thickness that is sufficient to grip the threaded end 250 of fastener 50.

The head portions 80A, 80B of grinding teeth 30A, 30B are curved relative to the mounting base portion 70A, 70B so that the head portions 80A, 80B extend away from the side surface 170A, 170B of the wheel 20 when the grinding teeth 30A, 30B are fastened to the wheel 20. When viewed from a top perspective (e.g., FIGS. 3 and 5), the longitudinal axis of the head portion 80A, 80B angle away from a plane defined by the inner surface 130A, 130B of the mounting base portion 70A, 70B at an angle $\theta$, which is greater than 0° but less than about 75°, and is preferably between about 30° and about 60°, and most preferably about 45°.

Figure 7:
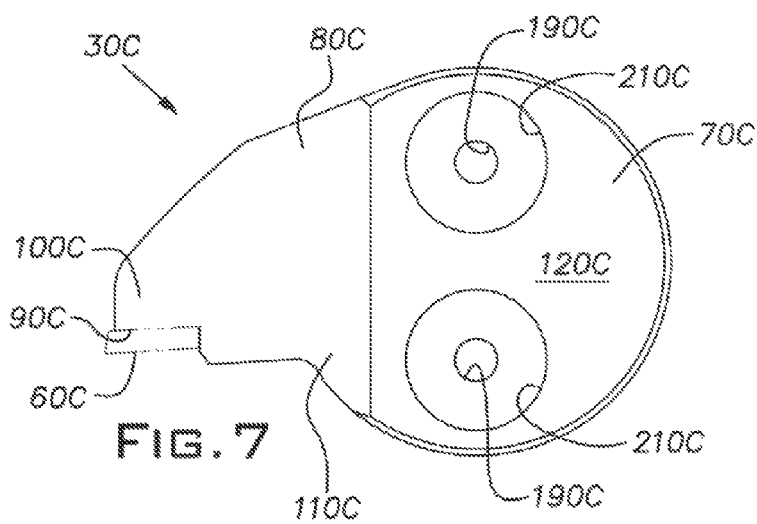
FIG. 7 is a side elevation view of another one of the grinding teeth shown in FIG. 1.
Figure 8:
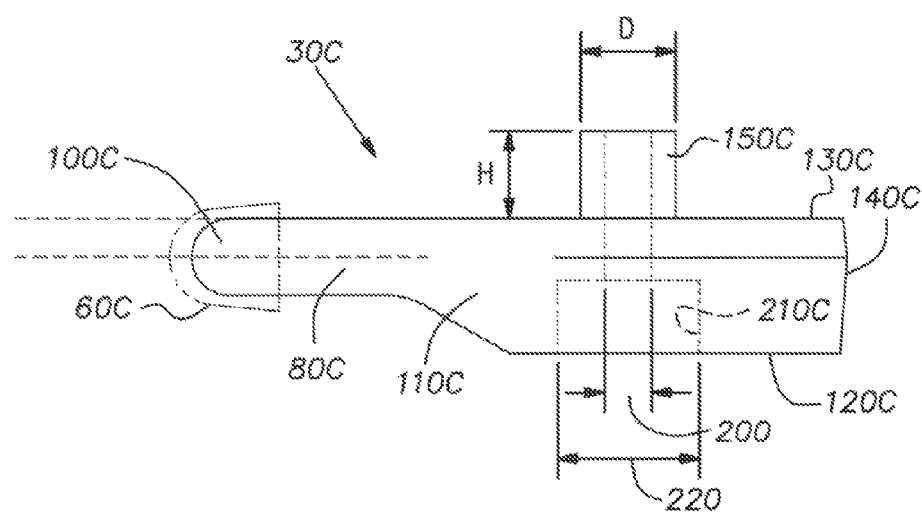
FIG. 8 is a top view further illustrating the grinding tooth shown in FIG. 7.
Figure 9:
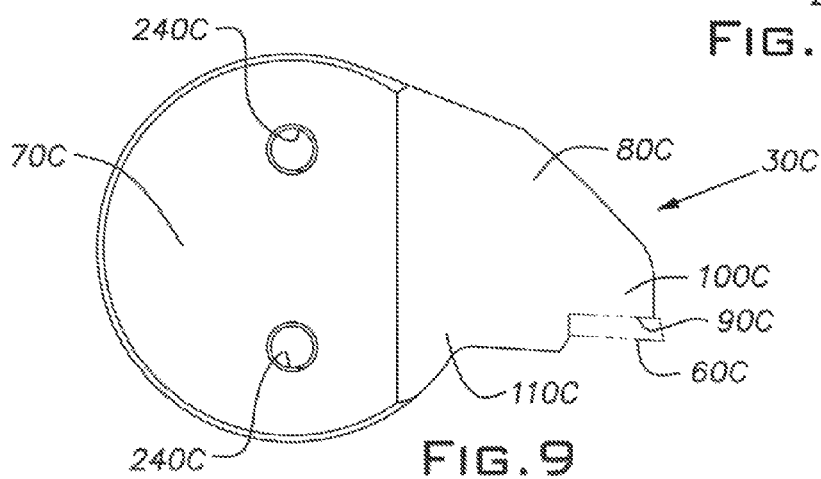
FIG. 9 is a side elevation view of another one of the grinding teeth shown in FIG. 1.
Figure 10:
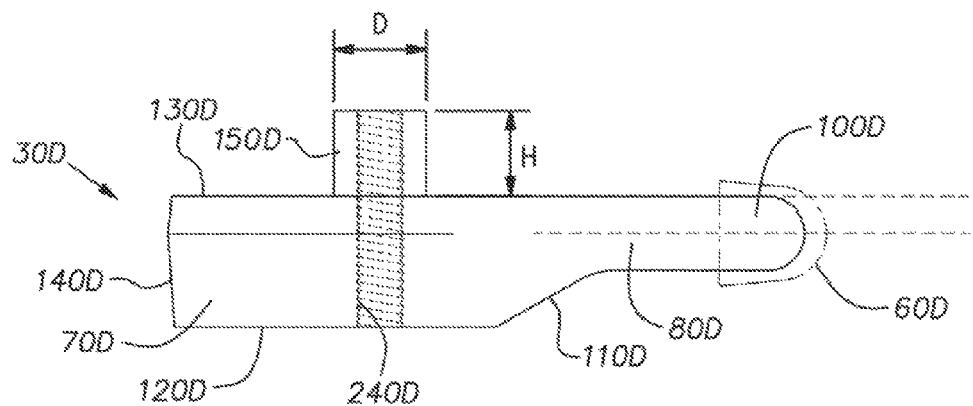
FIG. 10 is a top view further illustrating the grinding tooth shown in FIG. 9.
Figure 11:
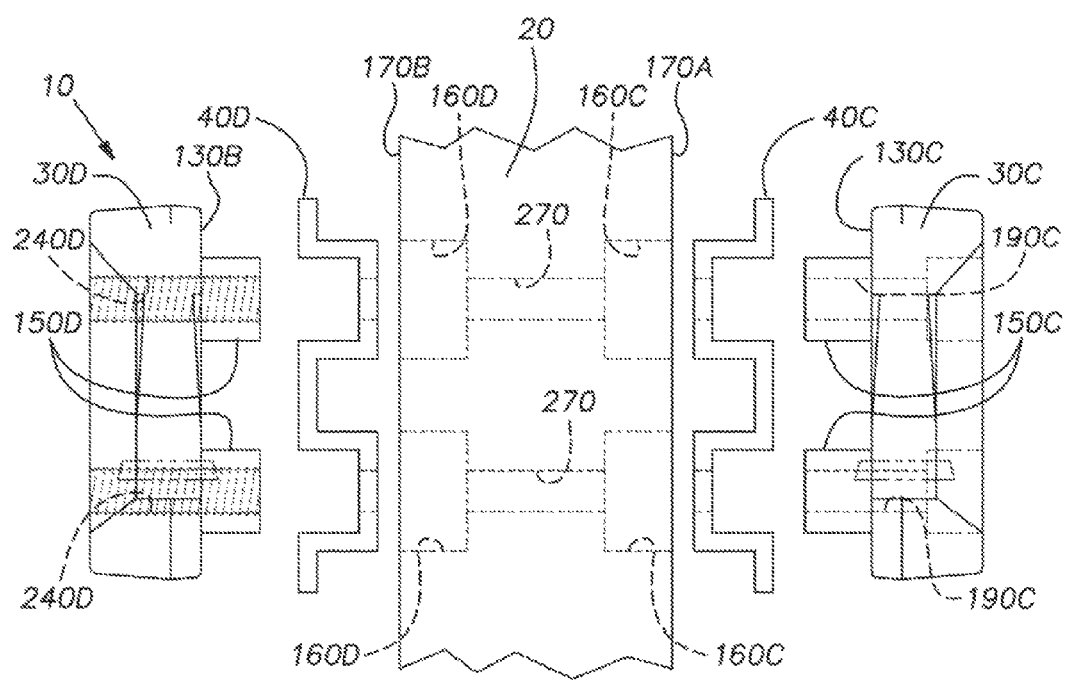
FIG. 11 is an exploded front elevation view of the grinding teeth, impact pads and a portion of the wheel shown in FIGS. 1 and 7-10.

FIGS. 7 and 8 show a side elevation view and a top view, respectively, of grinding tooth 30C shown in FIG. 1. FIGS. 9 and 10 show a side elevation view and a top view, respectively, of grinding tooth 30D shown in FIG. 1. FIG. 11 shows an exploded front elevation view of grinding teeth 30C, 30D, impact pads 40C, 40D and a portion of a wheel 20. The grinding teeth 30C, 30D shown in FIGS. 7-11 are the same as grinding teeth 30A, 30B shown in FIGS. 2-6, except that when viewed from a top perspective (e.g., FIGS. 8 and 10), the longitudinal axis of the head portion 80C, 80D is parallel to the plane defined by the inner surface 130C, 130D of the mounting base 70C, 70D.

It will be appreciated that if desired, the longitudinal axis of the head portion could angle away from a plane defined by the inner surface of the mounting base portion 70 at a negative angle (not shown), provided the grinding tooth is fastened to the wheel proximal to its peripheral edge. This arrangement would provide a cutting bit at the periphery of the wheel, which can improve plunge cutting efficiency.

In the preferred embodiment of the invention, at least one, and preferably a plurality of pairs of grinding teeth 30C, 30D are fastened to opposing side surfaces 170A, 170B of the wheel 20 proximal to the peripheral edge 280 (see FIG. 1) such that the head portions 80C, 80D thereof extend beyond the peripheral edge 280 of the wheel 20. At least one, and preferably a plurality of pairs of grinding teeth 30A, 30B are fastened to opposing side surfaces 170A, 170B of the wheel 20 in radially inward locations in a swirled pattern. Thus, when the wheel 20 is rotated, a cutting bit 60A, 60B, 60C, 60D of one or more of the grinding teeth 30A, 30B, 30C, 30D, is in position to make contact with a tree stump on the entire outer periphery and both sides of the wheel 20.

FIG. 12 illustrates an alternative embodiment of the invention wherein the cleats 150E, 150F project from the inner surface of the grinding teeth 30E, 30F at points other than where the bolts pass through. In other words, unlike the grinding teeth 30A, 30B, 30C, 30D, shown in FIGS. 1-11, in which the clearance holes 190A, 190C and tapped holes 240B, 240D are concentric to the cleats 150A, 150B, 150C, 150D, in the embodiment shown in FIG. 12, the clearance holes 190E and tapped holes 240F are eccentric to the cleats 150E, 150F. And, in the embodiment shown in FIG. 12, the impact pads 40E, 40F cover the entire cleat 150E, 150F. The grinding teeth 30E, 30F, impact pad 40E, 40F and wheel 20 arrangement illustrated in FIG. 12 is presently most preferred.

FIGS. 13, 14, 15 and 16 illustrate alternative embodiments of impact pads 41, 42, 43 and 44, respectively. In FIG. 13, the impact pad 41 is configured to cover the cylindrical side walls of the cleats and a portion of the ends thereof, but is provided with openings 261 through which concentrically disposed fasteners can pass. In FIG. 14, the side walls of the openings 262 through the impact pad 42 are configured to cover the entire cylindrical side walls of the cleats, but not the ends thereof. In FIG. 15, the impact pad 43 is configured such that the side walls of the openings 263 through the impact pad 43 cover only a portion of the cylindrical side walls of the cleats (and not the ends thereof). In FIG. 16, the impact pad 44 is configured to cover the cleats entirely. Impact pad 44 also includes openings 264 through which eccentrically disposed fasteners can pass.

In operation, a wheel assembly according to the invention is mounted to a suitable stump grinding machine. The stump grinding machine rotates the wheel assembly (in the direction 25 shown in FIG. 1) at relatively high speed. The operator moves the rotating wheel assembly in plunging and sweeping motions with respect to a tree stump to be removed. When the cutting bits contact the tree stump, they grind, tear, chip or otherwise pummel the tree stump into small chunks, chips or pieces. The operator moves the rotating wheel assembly into contact with the tree stump until it is sufficiently ground away, typically to a point where no portion of the tree stump remains above the grade of the soil surrounding the tree stump.

The impact forces caused by the cutting bits striking the tree stump are translated through the head portion of the grinding teeth to the mounting base portion. However, because an impact pad is positioned between the inner surface of the mounting base portion and the side surface of the wheel, such forces are not directly communicated to the side surface of the wheel, where they could damage the wheel. Instead, the impact force and shock is translated to the impact pad, which absorbs and dissipates at least a portion of the energy. This prevents the grinding tooth from damaging the side surface of the wheel.

In addition, the cleats serve to help align the grinding teeth in the appropriate orientation on the side surface of the wheel. In addition, they provide a mechanical lock between the grinding teeth and the side surfaces of the wheel. Thus, it takes far greater force than necessary to shear the bolts to separate the grinding teeth from the wheel.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A tree stump grinding tooth comprising:
a mounting base portion having an inner surface and an outer surface;

a plurality of cleats projecting from the inner surface of the mounting base portion;
a head portion formed integrally with the mounting base portion;
a cutting bit provided on the head portion; and
at least one bore provided through the mounting base portion for receiving a fastener.

2. The tree stump grinding tooth according to claim 1 wherein each of the plurality of cleats has a cylindrical side wall.

3. The tree stump grinding tooth according to claim 1 wherein the at least one bore provided through the mounting base portion extends through one of the plurality of cleats.

4. The tree stump grinding tooth according to claim 1 further comprising a counterbore provided in the outer surface of the mounting base portion, said counterbore being concentric with the at least one bore provided through the mounting base portion.

5. The tree stump grinding tooth according to claim 1 wherein the mounting base portion and the head portion are formed of forged steel.

6. The tree stump grinding tooth according to claim 1 wherein the cutting bit is formed of tungsten carbide.

7. The tree stump grinding tooth according to claim 1 wherein the cutting bit is soldered to the head portion.

8. A tree stump grinding tooth comprising:
a mounting base portion having an inner surface and an outer surface;
a first cleat projecting from the inner surface of the mounting base portion, said first cleat having a cylindrical side wall;
a second cleat projecting from the inner surface of the mounting base portion, said second cleat having a cylindrical side wall;
a head portion formed integrally with the mounting base portion;
a cutting bit provided on the head portion;
a first bore for receiving a fastener, said first bore extending through the mounting base portion and the first cleat; and
a second bore for receiving a fastener, said second bore extending through the mounting base portion and the second cleat.

9. The tree stump grinding tooth according to claim 8 wherein the mounting base portion, the first cleat, the second cleat and the head portion integrally formed of forged steel, and wherein the cutting bit is formed of tungsten carbide.

10. The tree stump grinding tooth according to claim 9 wherein the inner surface of the mounting base portion is substantially planar.

11. The tree stump grinding tooth according to claim 10 wherein both the first cleat and the second cleat each have an outer diameter that is from about 0.5" to about 2.0" and a height that is from about 0.25" to about 0.75".

* * * * *